United States Patent
Utashiro et al.

(10) Patent No.: US 11,466,432 B2
(45) Date of Patent: Oct. 11, 2022

(54) WORK VEHICLE

(71) Applicant: Hitachi Construction Machinery Co., Ltd., Tokyo (JP)

(72) Inventors: Hiroshi Utashiro, Ibaraki (JP); Akinori Kamiya, Ibaraki (JP); Noritaka Ito, Ibaraki (JP); Takatoshi Ooki, Ibaraki (JP); Satoshi Sekino, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 37 days.

(21) Appl. No.: 17/255,185

(22) PCT Filed: Mar. 28, 2019

(86) PCT No.: PCT/JP2019/013663
§ 371 (c)(1),
(2) Date: Dec. 22, 2020

(87) PCT Pub. No.: WO2020/194680
PCT Pub. Date: Oct. 1, 2020

(65) Prior Publication Data
US 2021/0262198 A1 Aug. 26, 2021

(51) Int. Cl.
*E02F 9/20* (2006.01)
*E02F 9/22* (2006.01)
(Continued)

(52) U.S. Cl.
CPC .............. *E02F 9/2075* (2013.01); *B60K 6/46* (2013.01); *B60L 50/61* (2019.02); *B60W 10/06* (2013.01);
(Continued)

(58) Field of Classification Search
CPC ..... E02F 9/2075; E02F 9/2203; E02F 9/2296; E02F 3/283; B60W 20/14; B60W 10/06;
(Continued)

(56) References Cited

U.S. PATENT DOCUMENTS

| 2002/0148144 A1 | 10/2002 | Tokunaga |
| 2004/0172206 A1* | 9/2004 | Saeki .................. B60L 15/2045 702/60 |

FOREIGN PATENT DOCUMENTS

| CN | 101189420 A  *  5/2008 ............... B60K 6/44 |
| JP | 2000-291451 A    10/2000 |

(Continued)

OTHER PUBLICATIONS

Machine translation JP2000291451A filed Mar. 26, 2022 (Year: 2022).*

(Continued)

*Primary Examiner* — Tisha D Lewis
(74) *Attorney, Agent, or Firm* — Crowell & Moring LLP

(57) ABSTRACT

To provide a technique for reliably acquiring a required braking power during travel and for efficiently using a regenerative power generated during braking. A work vehicle calculates a regenerative power outputted from an electric motor and a target hydraulic driving power for driving a hydraulic pump, supplies the regenerative power to the generator motor operating as a motor and makes the generator motor consume the regenerative power in a case where the regenerative power is equal to or smaller than the target hydraulic driving power, and supplies the regenerative power to the generator motor operating as the motor and makes an exhaust brake consume a power equivalent to a difference between the regenerative power and the target hydraulic driving power in a case where the regenerative power is larger than the target hydraulic driving power.

4 Claims, 6 Drawing Sheets

(51) Int. Cl.
  *B60W 10/198* (2012.01)
  *B60W 20/14* (2016.01)
  *B60L 50/61* (2019.01)
  *B60K 6/46* (2007.10)
  *B60W 10/06* (2006.01)
  *B60W 10/08* (2006.01)
  *B60W 10/30* (2006.01)
  *E02F 3/28* (2006.01)

(52) U.S. Cl.
  CPC .......... *B60W 10/08* (2013.01); *B60W 10/198* (2013.01); *B60W 10/30* (2013.01); *B60W 20/14* (2016.01); *B60W 2510/0638* (2013.01); *B60W 2520/06* (2013.01); *B60W 2520/10* (2013.01); *B60W 2540/10* (2013.01); *B60W 2710/06* (2013.01); *B60W 2710/08* (2013.01); *B60W 2710/18* (2013.01); *B60W 2710/305* (2013.01); *B60Y 2200/415* (2013.01); *B60Y 2200/92* (2013.01); *E02F 3/283* (2013.01); *E02F 9/2203* (2013.01); *E02F 9/2296* (2013.01)

(58) Field of Classification Search
  CPC .... B60W 10/08; B60W 10/198; B60W 10/30; B60W 2510/0638; B60W 2520/06; B60W 2520/10; B60W 2540/10; B60W 2710/06; B60W 2710/08; B60W 2710/18; B60W 2710/305; B60L 50/61; B60K 6/46; B60Y 2200/415; B60Y 2200/92
  See application file for complete search history.

(56) References Cited

FOREIGN PATENT DOCUMENTS

| | | | | | |
|---|---|---|---|---|---|
| JP | 2000291451 A | * | 10/2000 | ............... | B60K 6/46 |
| JP | 2002-315105 A | | 10/2002 | | |
| JP | 2016-104927 A | | 6/2016 | | |
| JP | 2016104927 A | * | 6/2016 | ............... | B60K 6/46 |
| JP | 2018105114 A | * | 7/2018 | ............... | B60K 6/44 |
| WO | WO 2014/175195 A1 | | 10/2014 | | |

OTHER PUBLICATIONS

International Search Report (PCT/ISA/210) issued in PCT Application No. PCT/JP2019/013663 dated Jun. 18, 2019 with English translation (three (3) pages).

Japanese-language Written Opinion (PCT/ISA/237) issued in PCT Application No. PCT/JP2019/013663 dated Jun. 18, 2019 (five (5) pages).

* cited by examiner

|  | V-SHAPE EXCAVATION (WITHOUT HYDRAULIC PRESSURE) | V-SHAPE EXCAVATION (WITH THYDRAULIC PRESSURE) | DOWNHILL TRAVEL |
|---|---|---|---|
| ENGINE SPEED | LOW | HIGH | HIGH |
| HYDRAULIC DRIVING POWER | LOW | HIGH | LOW |
| $E_{hyd}$ | LOW | HIGH | LOW |
| $E_{tar\_exh}$ | HIGH | LOW | HIGH |
| $E_{tar\_br}$ | LOW | LOW | HIGH |

WORK VEHICLE

TECHNICAL FIELD

The present invention relates to a work vehicle adapted to perform an operation such as excavation and to travel. More particularly, the present invention relates to a work vehicle equipped with an electric motor as a travelling actuator.

BACKGROUND ART

In the field of the work vehicles including construction machines, recent years have seen progress in the development of a so-called hybrid machine which adopts an electric motor as the travelling actuator and uses hydraulic power in combination with electric power particularly for energy-saving purposes. For example, Patent Literature 1 discloses a technique where a travel drive section of a wheel loader is motorized so as to recover regenerative electric power generated by the electric motor during travel braking and to use the regenerative electric power for travelling or for driving of a working actuator.

In such a hybrid wheel loader, a rotary shaft of a travelling electric motor is rotated by a rotational power acting on the rotary shaft via a propeller shaft during downhill travelling or braking operation so that the travelling electric motor generates the regenerative electric power in conjunction with the rotation of the rotary shaft. The resultant regenerative electric power is charged in an electric storage device such as battery and capacitor. When the travelling electric motor generates the regenerative electric power, a force resisting the rotation of the rotary shaft occurs. This resistive force acts as brake against the travel of the vehicle.

CITATION LIST

Patent Literature

PTL 1: International Patent Publication No. 2014/175195

SUMMARY OF INVENTION

Technical Problem

However, the greater the generated braking power is, the greater the resultant regenerative electric power is. This leads to the need for an electric storage device having a very high capacity in order to cope with the large electric power. Furthermore, in a case where the electric storage device is fully charged, the storage device cannot be charged any more. This results in a problem that the vehicle cannot acquire as much braking power as required.

The present invention has been accomplished in the light of the above-described actual circumstances and an object thereof is to provide a technique that enables the work vehicle using the electric motor as the travelling actuator to reliably acquire a required braking power during travel and to effectively utilized the regenerative electric power generated during braking.

Solution to Problem

According to an aspect of the present invention for achieving the above object, a work vehicle includes: an engine; a generator motor for generating electric power by operating on drive power of the engine; an electric motor operating on electric power supplied from the generator motor; drive wheels rotating with drive power of the electric motor transmitted thereto; a hydraulic pump for force feeding hydraulic oil by operating on the drive power transmitted from the engine or the generator motor operating as a motor; a hydraulic actuator operating on the hydraulic oil supplied from the hydraulic pump; a throttle device for actuating an exhaust brake as disposed at a tube exhaust duct of the engine; and a controller for controlling the operations of the generator motor and the throttle device, and has a configuration wherein the controller calculates a regenerative power outputted from the electric motor and a target hydraulic driving power for driving the hydraulic pump, supplies the regenerative power to the generator motor operating as the motor and makes the generator motor consume the regenerative power in a case where the regenerative power is equal to or smaller than the target hydraulic driving power, and supplies the regenerative power to the generator motor operating as the motor and makes the exhaust brake consume a power equivalent to a difference between the regenerative power and the target hydraulic driving power in a case where the regenerative power is larger than the target hydraulic driving power.

Advantageous Effects of Invention

According to the present invention, the work vehicle adopting the electric motor as the travelling actuator is adapted to reliably acquire the required braking power during travel and to efficiently use the regenerative power generated during braking. It is noted that problems, configurations and effects other than the above will become apparent from the following description of the embodiments thereof.

DESCRIPTION OF EMBODIMENT

Each embodiment of a wheel loader 100 according to the present invention will hereinbelow be described with reference to the accompanying drawings. Unless otherwise particularly stated, the directions forward, backward, left and right directions are defined herein on the basis of the viewpoint of an operator operating the wheel loader 100 in the wheel loader.

Figure 1:
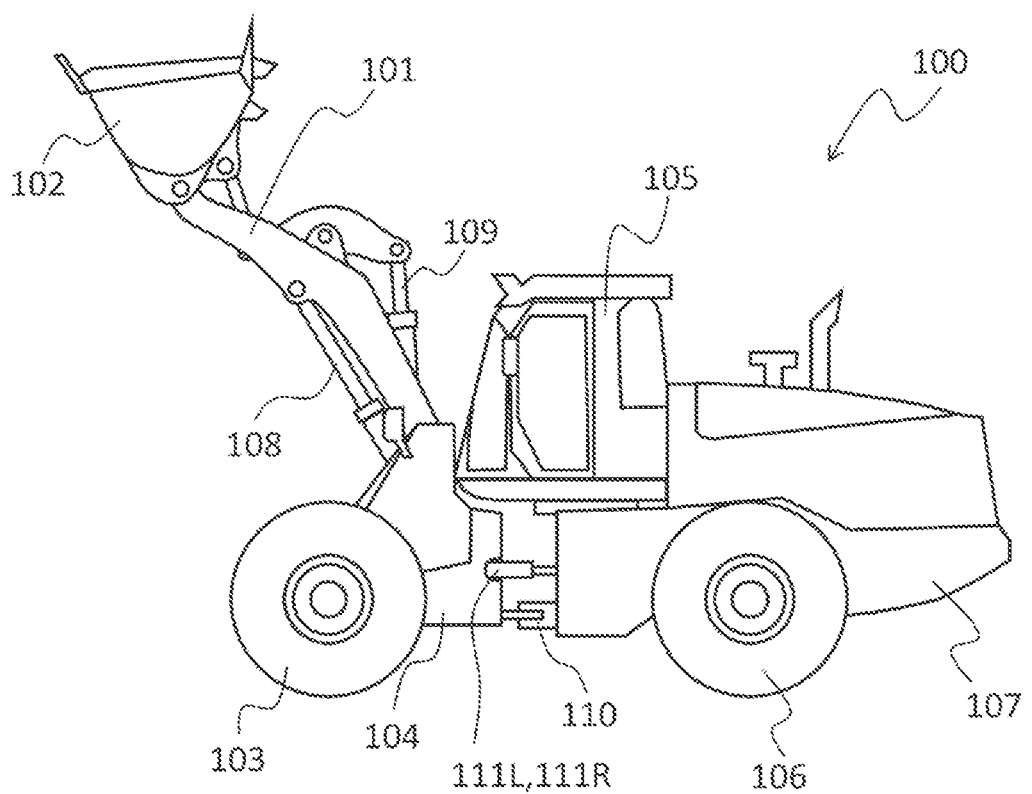
FIG. 1 is a side view showing a wheel loader according to a present embodiment.

FIG. 1 is a side view showing the wheel loader 100 according to the embodiment. The wheel loader 100 essentially includes: a front frame 104 having lift arms 101, a bucket 102, a pair of right and left front wheels 103 and the like; and a rear frame 107 having a cab 105, a pair of right and left rear wheels 106 and the like.

The front wheels 103 and the rear wheels 106 are drive wheels powered by an electric motor 14 (see FIG. 2) installed in the wheel loader 100. More specifically, the electric motor 14 rotates as supplied with an electric power generated by a generator motor 11 driven by a drive power of an engine 10. The rotational drive power of the electric motor 14 is gear-shifted by means of a transmission (not shown) and transmitted to the front wheels 103 and the rear wheels 106 via the propeller shaft and an axle.

The lift arms 101 vertically pivot (swing up or down) in conjunction of the extension or retraction of a lift arm cylinders 108. The bucket 102 vertically pivots (cloud or dump) in conjunction with the extension or retraction of a bucket cylinder 109. The lift arms 101, the bucket 102, the lift arm cylinders 108 and the bucket cylinder 109 constitute a front work device.

The front frame 104 and the rear frame 107 are laterally rotatably coupled together by means of a center pin 110. Further, the front frame 104 and the rear frame 107 are connected together by means of a pair of right and left steering cylinders 111L, 111R. The steering cylinders 111L, 111R each have a front end connected to the front frame 104 and a rear end laterally rotatably connected to the rear frame 107.

The front frame 104 is made to laterally bend about the center pin 110 relative to the rear frame 107 by extending one of the pair of steering cylinders 111L, 111R and retracting the other. Thus, a relative mounting angle between the front frame 104 and the rear frame 107 is varied so that a vehicle body is bent and made to turn about. That is, the wheel loader 100 has an articulated structure where the front frame 104 and the rear frame 107 are adapted to bend relative to each other about the center pin 110.

The cab 105 is formed with an interior space for the operator to get in to operate the wheel loader 100. Arranged in the cab 105 are a seat (not shown) where the operator is seated, and an operation device operated by the operator seated in the seat. The operator in the cab 105 operates the operation device so that the wheel loader 100 travels and the front work device operates.

Figure 2:
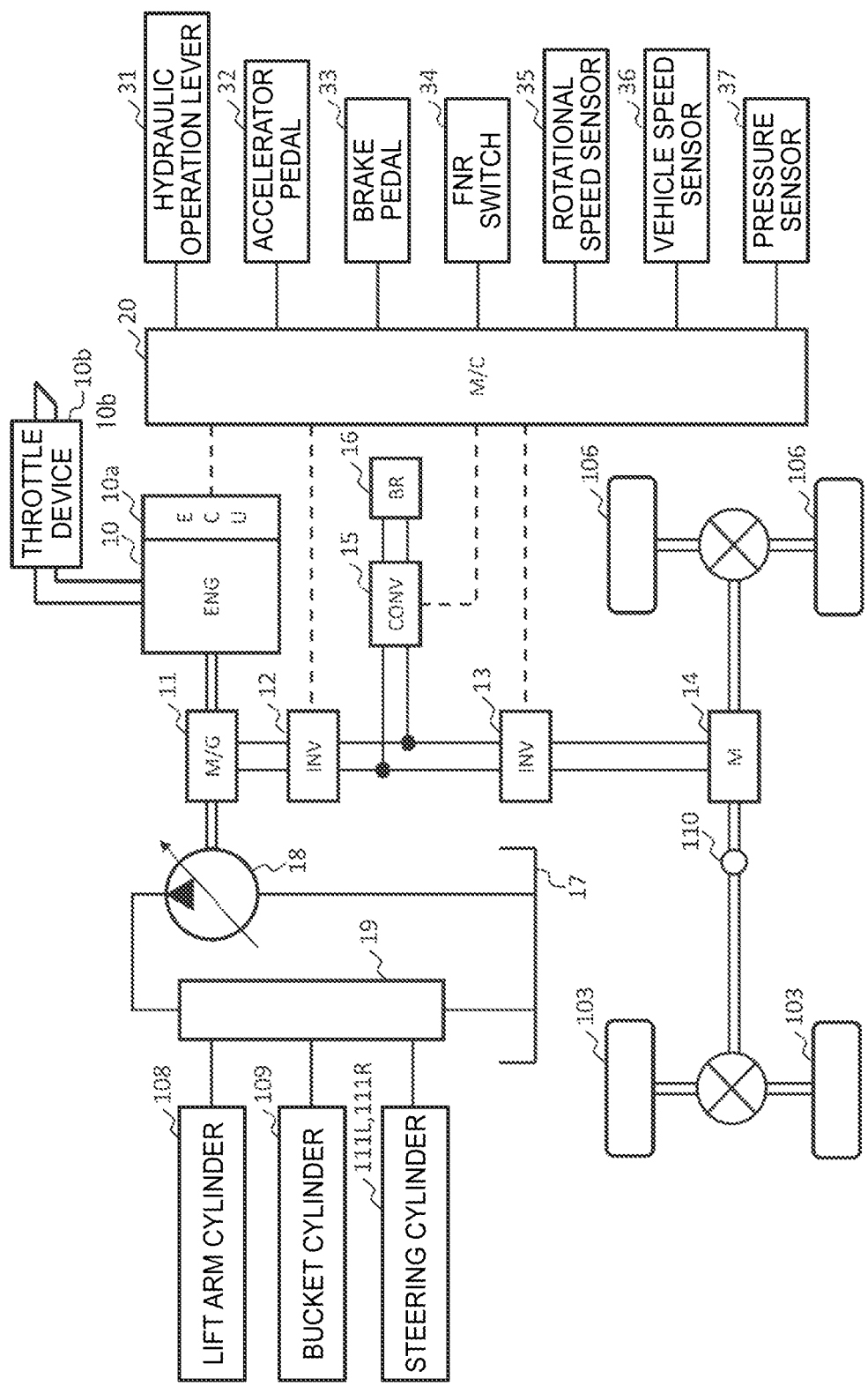
FIG. 2 is a hardware configuration diagram of the wheel loader.

The operation device receives an operation made by the operator operating the wheel loader 100. Subsequently, the operation device outputs, to a controller 20 (see FIG. 2), an operation signal corresponding to an operational direction and a quantity of operation by the operator. As shown in FIG. 2, for example, the operation device includes a hydraulic operation lever 31, an accelerator pedal 32, a brake pedal 33, and an FNR switch 34.

The hydraulic operation lever 31 includes a steering lever for extending or retracting the steering cylinder 111L, 111R, an arm operation lever for extending or retracting the lift arm cylinders 108, and a bucket operation lever for extending or retracting the bucket cylinder 109. The hydraulic operation lever 31 outputs, as the operation signal, a lever signal indicating a down-tilt direction and a down-tilt quantity of each lever.

The accelerator pedal 32 regulates the rotational speed of the engine 10. The accelerator pedal 32 outputs an accelerator pedal stepping rate $Rat_{acc}$ as the operation signal. The brake pedal 33 brakes the front wheels 103 and the rear wheels 106. The brake pedal 33 outputs a brake pedal stepping rate $Rat_{brk}$ as the operation signal. The FNR switch 34 changes a travelling direction (forward, backward, neutral) of the wheel loader 100. The FNR switch 34 outputs, as the operation signal, an FNR signal indicating any one of the directions forward, backward, and neutral.

FIG. 2 is a hardware configuration diagram of the wheel loader 100. The wheel loader 100 essentially includes the engine (ENG) 10, the generator motor (M/G) 11, inverters (INV) 12, 13, the electric motor (M) 14, a converter (CONV) 15, a resistor (BR) 16, a hydraulic oil tank 17, a hydraulic pump 18, a directional control valve 19, and a controller (M/C) 20.

The engine 10 generates a drive power by combusting fossil fuel. The rotational speed of the engine 10 is controlled by an ECU 10a. The actual rotational speed of the engine 10 (actual engine speed $\omega_{Eng}$) is detected by a rotational speed sensor 35. The rotational speed sensor 35 outputs, to the controller 20, a rotational speed signal indicating the actual engine speed $\omega_{Eng}$ thus detected.

A throttle device 10b is disposed at a tube exhaust duct of the engine 10. Under the control of the ECU 10a, the throttle device 10b increases or decreases the passage area of the exhaust gas flowing through the tube exhaust duct. The throttle device 10b actuates an exhaust brake by decreasing the passage area of the exhaust gas so that exhaust resistance provides load for reducing the speed (reduce the rotational speed) of the engine 10.

The generator motor 11 includes a rotor mounted to a rotary shaft in coaxial relation with an output shaft of the engine 10, and a stator disposed on an outer periphery of the rotor. The generator motor 11 generates a three-phase alternating electric power in conjunction with the rotor rotated by the drive power of the engine 10 transmitted thereto.

The inverter 12 converts the three-phase AC electric power outputted from the generator motor 11 to a DC electric power and outputs the resultant power to the inverter 13. In turn, the inverter 13 converts the DC electric power outputted from the inverter 12 to the three-phase AC electric power and outputs the resultant power to the electric motor 14.

Supplied with the three-phase AC electric power from the inverter 13, the electric motor 14 generates the drive power and outputs the resultant drive power to the propeller shaft. The drive wheels (the front wheels 103 and the rear wheels 106) are rotated by the drive power of the electric motor 14 transmitted thereto via the propeller shaft. This causes the wheel loader 100 to travel.

An actual travelling speed (hereinafter, written as "vehicle speed $V_{act}$") is detected by a vehicle speed sensor 36. The vehicle speed sensor 36 outputs a vehicle speed signal indicating the detected vehicle speed $V_{act}$ to the controller 20.

When braking the wheel loader 100, on the other hand, the electric motor 14 operates as an electric brake. The electric motor 14 operating as the electric brake generates the regenerative electric power (regenerative power) and outputs the power to the inverter 13. The inverter 13 converts the regenerative electric power of three-phase alternating current outputted from the electric motor 14 to the direct-current electric power and outputs the resultant electric power to the inverter 12 and a converter 15.

The inverter 12 converts the DC regenerative electric power outputted from the inverter 13 to the three-phase AC electric power and outputs the resultant electric power to the generator motor 11. The generator motor 11 operates as the motor on the three-phase AC electric power supplied from the inverter 12 so as to drive an output shaft (rotary shaft) of the engine 10. That is, some of the regenerative electric power generated by the electric motor 14 is converted to the drive power by the generator motor 11.

The converter 15 transforms the DC electric power supplied from the inverter 13 and outputs the resultant electric power to the resistor 16. The resistor 16 is a resistance element which converts the regenerative electric power supplied via the converter 15 to heat. That is, some of the regenerative electric power generated by the electric motor 14 is consumed by the resistor 16.

The hydraulic pump 18 is a variable capacity hydraulic pump and is connected to the output shaft of the engine 10. Specifically, the drive power of one or both of the engine 10 and the generator motor 11 operating as the motor is transmitted to the hydraulic pump 18, which, in turn, force feeds the hydraulic oil retained in the hydraulic oil tank 17 to the directional control valve 19. A discharge pressure P of the hydraulic oil force fed from the hydraulic pump 18 is detected by a pressure sensor 37. The pressure sensor 37 outputs, to the controller 20, a pressure signal indicating the detected discharge pressure P.

The directional control valve 19 supplies the hydraulic oil outputted from the hydraulic oil tank 17 to the lift arm cylinders 108, the bucket cylinder 109, and the steering cylinders 111L, 111R (these are collectively written as "hydraulic actuators"). More specifically, the directional control valve 19 controls the feed direction and flow rate of the hydraulic oil supplied to the hydraulic actuator according to the operational direction and operation quantity of the hydraulic operation lever 31.

The controller 20 controls the overall operations of the wheel loader 100. More specifically, the controller 20 controls the operations of the ECU 10a (namely, the engine 10 and the throttle device 10b), the inverters 12, 13, and the converter 15 on the basis of the operation signals outputted from the operation devices 31 to 34, the rotational speed signal outputted from the rotational speed sensor 35, the vehicle speed signal outputted from the vehicle speed sensor 36, and the pressure signal outputted from the pressure sensor 37.

The controller 20 includes, for example, a CPU (Central Processing Unit), a ROM (Read Only Memory), and a RAM (Random Access Memory). In the controller 20, individual functional blocks (to be described hereinafter) are implemented by the CPU retrieving individual program codes from the ROM and executing the program codes. The RAM is used as a work area for the CPU to execute the program.

It is noted, however, that the specific configuration of the controller 20 is not limited to this. The controller 20 may also be configured using hardware such as ASIC (Application Specific Integrated Circuit) and FPGA (Field-Programmable Gate Array).

Figure 3:
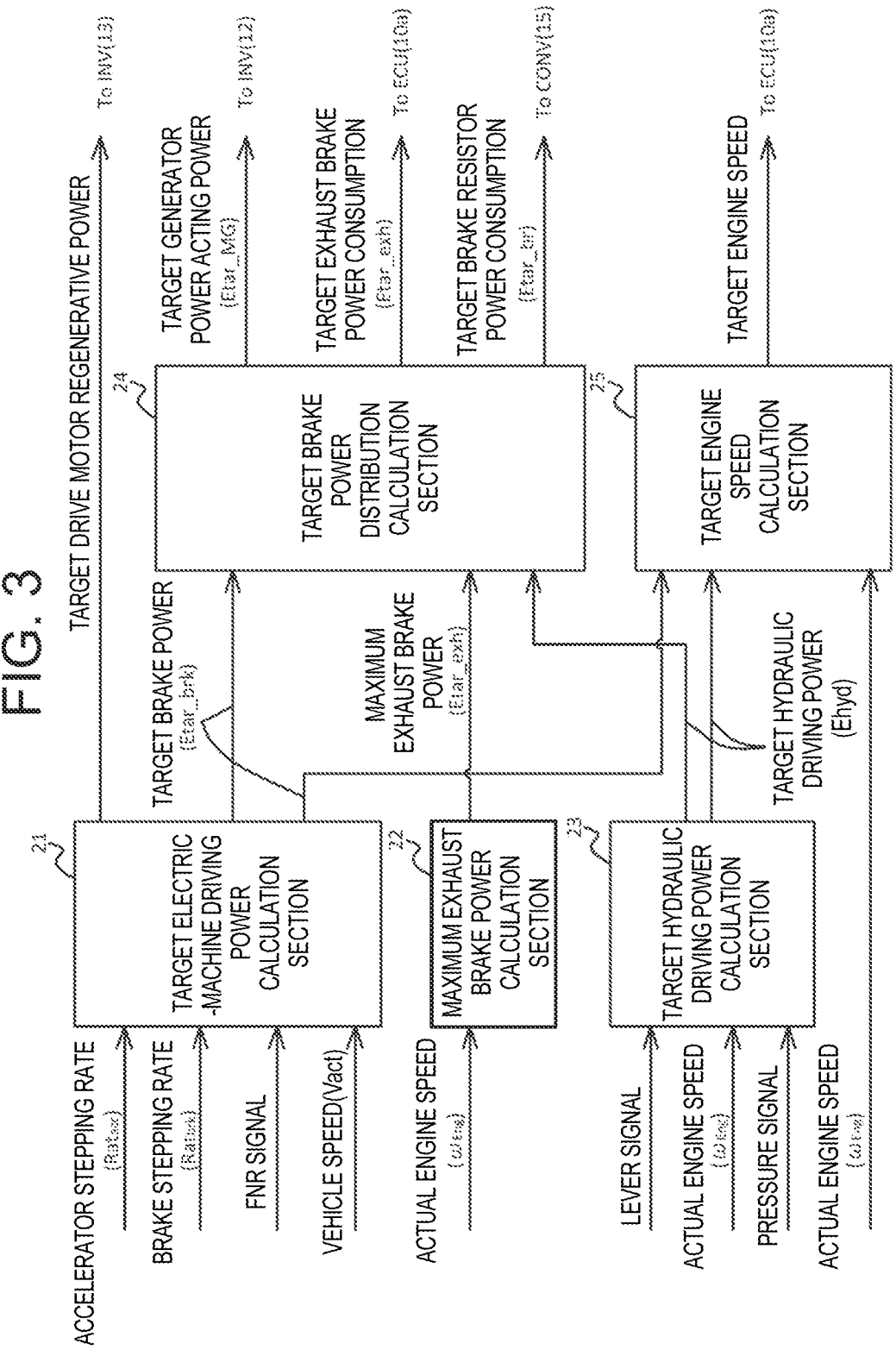
FIG. 3 is a functional block diagram of a controller.

FIG. 3 is a functional block diagram of the controller 20. The controller 20 includes a target electric-machine driving power calculation section 21, a maximum exhaust brake power calculation section 22, a target hydraulic driving power calculation section 23, a target brake power distribution calculation section 24, and a target engine speed calculation section 25.

The target electric-machine driving power calculation section 21 calculates a target brake power Etar_brk based on the accelerator pedal stepping rate $Rat_{acc}$ outputted from the accelerator pedal 32, the brake pedal stepping rate $Rat_{brk}$ outputted from the brake pedal 33, the FNR signal outputted from the FNR switch 34, and the vehicle speed $V_{act}$ outputted from the vehicle speed sensor 36.

The target brake power Etar_brk indicates a magnitude of the regenerative power (regenerative electric power) which the electric motor 14 generates when the front wheels 103 and the rear wheels 106 are braked. That is, the larger the brake power on the front wheels 103 and the rear wheels 106 is, the larger is the value of the target brake power Etar_brk.

The larger is the difference between the present vehicle speed $V_{act}$ of the wheel loader 100 and the post-braking target vehicle speed (target travelling speed) $V_{tar}$ thereof, the larger is the value of the target brake power Etar_brk. For example, the target vehicle speed $V_{tar}$ is calculated by using the following expression 1, while the target brake power Etar_brk is calculated by using the following expression 2. In the expression 1, FNR denotes a variable corresponding to the value of the FNR signal. The variable is set to 1 when the wheel loader is put in forward gear. The variable is set to −1 when the wheel loader is put in backward gear. The variable is set to 0 when the gear is put in neutral. $C_1$, $C_2$ in the expressions 1 and 2 denote predetermined constants, respectively.

[Mathematical Expression 1]

$$Vtar = FNR \cdot C_1 \cdot (Rat_{acc} - Rat_{brk}) \qquad \text{Expression 1}$$

$$Etar\_brk = C_2 \times (V_{act} - V_{tar}) \qquad \text{Expression 2}$$

The target electric-machine driving power calculation section 21 informs the target brake power distribution calculation section 24 and the target engine speed calculation section 25 of the calculated target brake power Etar_brk. Further, the target electric-machine driving power calculation section 21 outputs, to the inverter 13, a control signal directing to output an electric power (target drive motor regenerative power) equivalent to the target brake power Etar_brk.

The maximum exhaust brake power calculation section 22 calculates a maximum exhaust brake power Emax_exh based on the actual engine speed $\omega_{Eng}$ outputted from the rotational speed sensor 35. The maximum exhaust brake power Emax_exh indicates the magnitude of the power consumed by the exhaust brake in a case where the throttle device 10b is throttled to the maximum.

Figure 4:
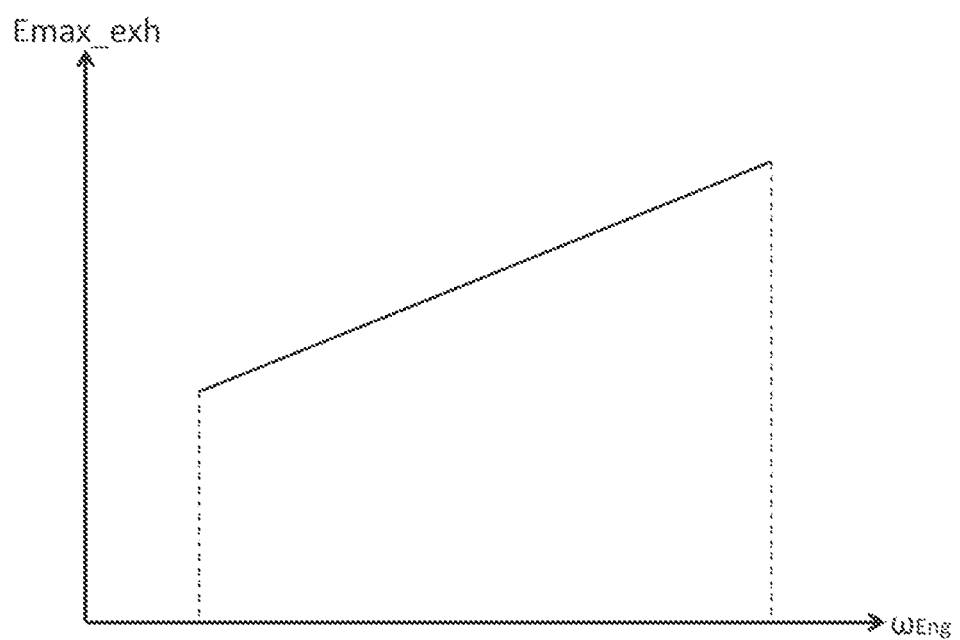
FIG. 4 is a graph showing a correspondence relation between actual engine speed and maximum exhaust brake power.

FIG. 4 is a graph showing a correspondence relation between the actual engine speed $\omega_{Eng}$ and the maximum exhaust brake power Emax_exh. As shown in FIG. 4, the maximum exhaust brake power Emax_exh is a function of the actual engine speed $\omega_{Eng}$. More specifically, the higher the actual engine speed $\omega_{Eng}$ is, the larger is the value of the maximum exhaust brake power Emax_exh. The lower the actual engine speed $\omega_{Eng}$, the smaller is the value of the maximum exhaust brake power Emax_exh. The correspondence relation of FIG. 4 is previously determined by experiment or simulation and stored in the storage device (ROM, RAM).

The maximum exhaust brake power calculation section 22 calculates a maximum exhaust brake power Emax_exh corresponding to the present actual engine speed $\omega_{Eng}$ based on, for example, the correspondence relation stored in the storage device. Subsequently, the maximum exhaust brake power calculation section 22 informs the target brake power distribution calculation section 24 of the calculated maximum exhaust brake power Emax_exh.

The target hydraulic driving power calculation section 23 calculates a target hydraulic driving power Ehyd based on the lever signal outputted from the hydraulic operation lever 31, the actual engine speed $\omega_{Eng}$ outputted from the rotational speed sensor 35, and the pressure signal outputted from the pressure sensor 37. The target hydraulic driving power calculation section 23 informs the target brake power distribution calculation section 24 and the target engine speed calculation section 25 of the calculated target hydraulic driving power Ehyd.

The target hydraulic driving power Ehyd indicates the magnitude of the power driving the hydraulic pump 18. Specifically, a target flow rate of the hydraulic pump 18 is determined based on the lever signal outputted from the hydraulic operation lever 31 and the actual engine speed $\omega_{Eng}$ outputted from the rotational speed sensor 35. Subsequently, a value obtained by multiplying the pressure signal outputted from the pressure sensor 37 by the target flow rate is derived as the target hydraulic driving power Ehyd.

That is, the larger the down-tilt quantity of the hydraulic operation lever 31 is, the larger is the value of the target hydraulic driving power Ehyd. The higher the actual engine speed $\omega_{Eng}$ is, the larger is the value of the target hydraulic driving power Ehyd. The higher the pressure of the hydraulic oil outputted from the hydraulic pump 18 is, the larger is the value of the target hydraulic driving power Ehyd.

For example, the target hydraulic driving power Ehyd is calculated using the following expression 3. In the expression 3, "$\eta$" denotes a pump efficiency of the hydraulic pump 18 and is a predetermined constant. In the expression 3, "Q" denotes a discharge flow rate of the hydraulic oil from the hydraulic pump 18 and varies according to the operation quantity of the hydraulic operation lever 31 indicated by the lever signal and the actual engine speed $\omega_{Eng}$. In the expression 3, "i" denotes an index indicating each hydraulic pump in a case where the wheel loader 100 is equipped with a plurality of hydraulic pumps.

[Mathematical Expression 2]

$$Ehyd = \Sigma(\eta_i P_i Q_i)/60 \qquad \text{Expression 3}$$

The target brake power distribution calculation section 24 calculates a target generator power acting power Etar_MG, a target exhaust brake power consumption Etar_exh, and a target brake resistor power consumption Etar_br based on the target brake power Etar_brk calculated by the target electric-machine driving power calculation section 21, the maximum exhaust brake power Emax_exh calculated by the maximum exhaust brake power calculation section 22, and the target hydraulic driving power Ehyd calculated by the target hydraulic driving power calculation section 23. A specific operation of the target brake power distribution calculation section 24 will be described hereinafter with reference to FIG. 7.

The target generator power acting power Etar_MG indicates the magnitude of the power (regenerative electric power) to be supplied to the generator motor 11 in order to drive the hydraulic actuator according to the operation quantity of the hydraulic operation lever 31. The target brake power distribution calculation section 24 outputs, to the inverter 12, a control signal directing to output an electric power equivalent to the calculated target generator power acting power Etar_MG.

The target exhaust brake power consumption Etar_exh indicates the magnitude of power (drive power) to be consumed by the exhaust brake. The target brake power distribution calculation section 24 outputs, to the ECU 10a, a control signal directing to make the exhaust brake consume the calculated target exhaust brake power consumption Etar_exh.

The target brake resistor power consumption Etar_br indicates the magnitude of the power (regenerative electric power) to be consumed by the resistor 16. That is, the target brake resistor power consumption Etar_br indicates the magnitude of the power out of the target brake power Etar_brk that is to be converted to heat by the resistor 16. Then, the target brake power distribution calculation section 24 outputs, to the converter 15, a control signal directing to output an electric power equivalent to the calculated target brake resistor power consumption Etar_br.

The target engine speed calculation section 25 calculates a target engine speed based on the target hydraulic driving power Ehyd calculated by the target hydraulic driving power calculation section 23, and the actual engine speed $\omega_{Eng}$ outputted from the rotational speed sensor 35. The target engine speed is a target value of the rotational speed of the engine 10. The target engine speed calculation section 25 outputs, to the ECU 10a, a control signal directing to rotate the engine 10 at the calculated engine speed. A specific operation of the target engine speed calculation section 25 will be described hereinafter with reference to FIG. 7.

Figures 5, 6:
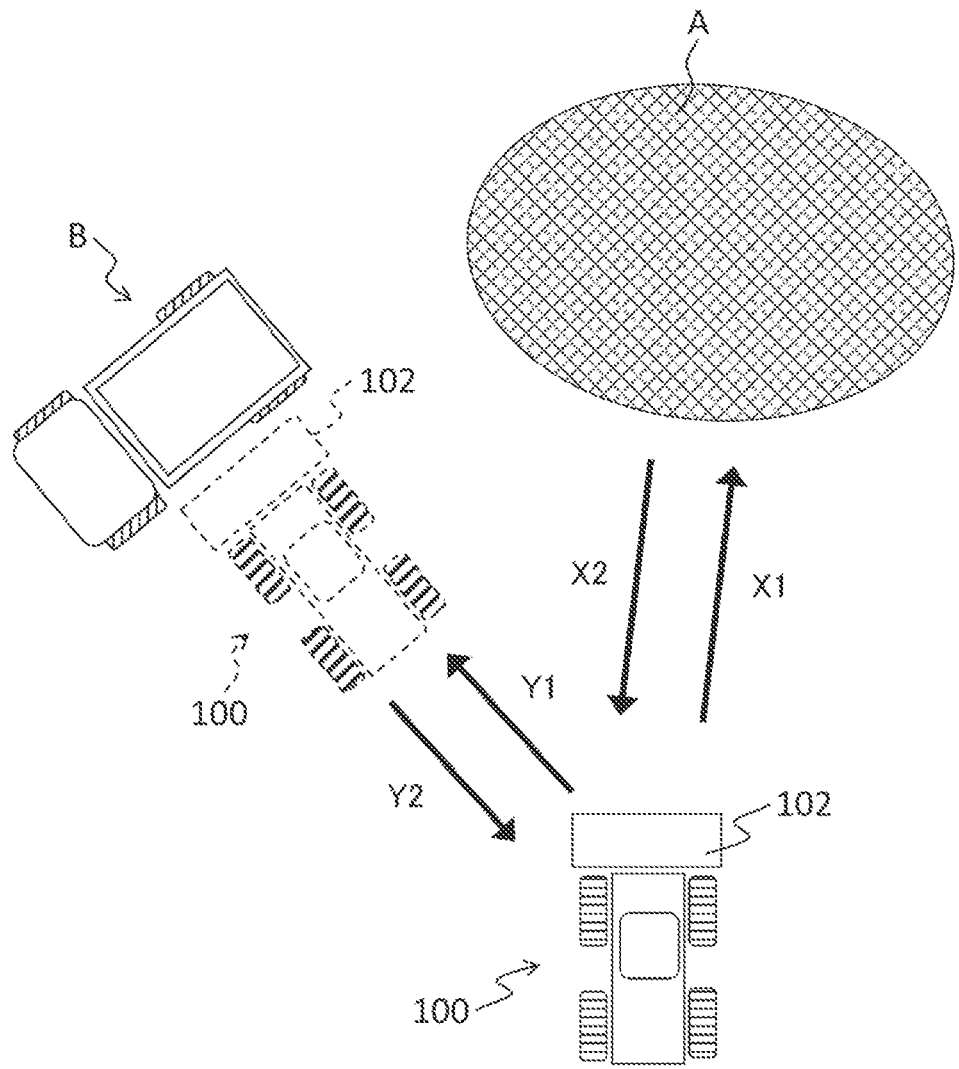
FIG. 5 is an explanatory diagram illustrating a V-shape loading by the wheel loader.
FIG. 6 is a table showing relations of engine speed, hydraulic driving power, target hydraulic driving power, target exhaust brake power consumption, and target brake resistor power consumption in each operation of the wheel loader.

Next, description is made on V-shape loading as one of the methods used when the wheel loader 100 performs the excavation operation and the loading operation. FIG. 5 is an explanatory diagram illustrating V-shape loading by the wheel loader 100. FIG. 6 is a table showing relations between the engine speed, the hydraulic driving power, the target hydraulic driving power Ehyd, the target exhaust brake power consumption Etar_exh, and the target brake resistor power consumption Etar_br in each operation of the wheel loader 100.

First, the wheel loader 100 moves forward to a natural ground A as a work object (arrow X1 shown in FIG. 5), and performs the excavation operation by tilting the bucket 102 plunged into the natural ground A. At this time, the operator provides a combined control by tilting the bucket 102 while increasing the drive of the wheel loader 100. At this time, no braking power is generated.

Subsequently when the excavation operation ends, the wheel loader 100 moves backward with the excavated earth, sand and minerals loaded in the bucket 102. After moving back for a sufficient distance, the operator changes the moving direction from backward to forward (arrow X2 shown in FIG. 5). At this time, the operator provides a single control to slow down the wheel loader 100 without operating the bucket 102. As indicated by the column "V-shape excavation (without hydraulic pressure)" of FIG. 6, therefore, the wheel loader has a tendency that the engine speed, the hydraulic driving power, and the target hydraulic driving power Ehyd decrease, the target exhaust brake power consumption Etar_exh increases and the target brake resistor power consumption Etar_br decreases.

Next, the wheel loader 100 moves forward to a dump truck B (arrow Y1 shown in FIG. 5), stops short of the dump truck B (position of the wheel loader 100 depicted with a broken line), and dumps the earth and sand in the bucket 102. At this time, the operator provides the combined control by dumping the earth and sand in the bucket while slowing down the wheel loader 100. Therefore, as indicated by the column "V-shape excavation (with hydraulic pressure)" of FIG. 6, the wheel loader has a tendency that the engine speed, the hydraulic driving power, and the target hydraulic driving power Ehyd increase, while the target exhaust brake power consumption Etar_exh and the target brake resistor power consumption Etar_br decrease.

Subsequently, when finishing the operation of loading the earth and sand onto the dump truck B, the wheel loader 100 moves backward with no load in the backet 102. After moving back for a sufficient distance, the operator changes the moving direction from backward to forward (arrow Y2 shown in FIG. 5). At this time, the operator provides a single control to slow down the wheel loader 100 without operating the bucket 102. Therefore, the wheel loader exhibits the tendency as indicated by the column "V-shape excavation (without hydraulic pressure)" of FIG. 6. Then, the wheel loader 100 reciprocally moves on the V-shaped path between the natural ground A and the dump truck B, performing the excavation operation and the loading operation.

In some environment of a work site, the wheel loader 100 may travel on a long slope. At this time, the operator does not operate the bucket 102 and controls the speed of the wheel loader 100 by gently braking the front wheels 103 and the rear wheels 106. Therefore, as indicated by the column "Downhill travel" of FIG. 6, the wheel loader exhibits a tendency that the engine speed increases, the hydraulic driving power and the target hydraulic driving power Ehyd decrease, and the target exhaust brake power consumption Etar_exh and the target brake resistor power consumption Etar_br increase.

Figure 7:
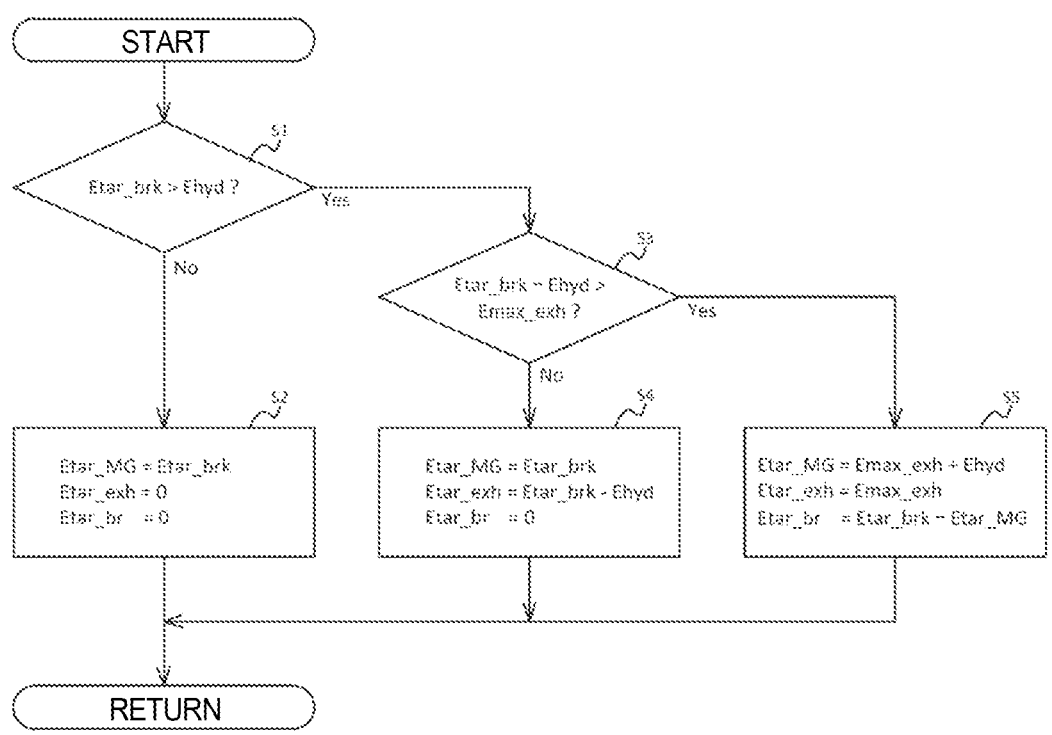
FIG. 7 is a flow chart showing the steps of calculations of Etar_MG, Etar_exh, Etar_br performed by a target brake power distribution calculation section.

Next, referring to FIG. 7, description is made on a processing of the controller 20 during each of the above-described operations of the wheel loader 100. FIG. 7 is a flow chart showing the steps of calculations of Etar_MG, Etar_exh, and Etar_brk performed by the target brake power distribution calculation section 24. The target brake power distribution calculation section 24 repeatedly performs the processing shown in FIG. 7 at predetermined time intervals.

First, the target brake power distribution calculation section 24 compares the target brake power Etar_brk calculated by the target electric-machine driving power calculation section 21 with the target hydraulic driving power Ehyd calculated by the target hydraulic driving power calculation section 23 (S1).

It is noted here that a case where the target brake power Etar_brk is equal to or smaller than the target hydraulic driving power Ehyd is a case where a power to be transmitted to the hydraulic pump 18 is so large that the target hydraulic driving power Ehyd alone can cover the target brake power Etar_brk, just as in the case where the above-described combined control is provided.

In the case of determining Etar_brk≤Ehyd (S1: No), the target brake power distribution calculation section 24 makes settings as the target generator power acting power Etar_MG=Etar_brk, the target exhaust brake power consumption Etar_exh=0, and the target brake resistor power consumption Etar_brk=0, and outputs control signals to the ECU 10*a*, the inverter 12, and the converter 15 (S2). That is, in a case where the regenerative power is equal to or smaller than the target hydraulic driving power Ehyd, the controller 20 supplies the regenerative power to the generator motor 11 operating as the motor and makes the generator motor consume the supplied power. In Step S2, all the regenerative power generated by the electric motor 14 is supplied to the generator motor 11 and converted to the drive power for the hydraulic pump 18.

On the other hand, a case where the target brake power Etar_brk is larger than the target hydraulic driving power Ehyd is a case where a power transmitted to the hydraulic pump 18 is small so that the regenerative power alone can cover the target hydraulic driving power Ehyd. Accordingly, in the case of determining Etar_brk>Ehyd (S1: Yes), the target brake power distribution calculation section 24 compares a difference between the target brake power Etar_brk and the target hydraulic driving power Ehyd with the maximum exhaust brake power Emax_exh (S3).

The difference between the target brake power Etar_brk and the target hydraulic driving power Ehyd is a remaining power after consumption of the target hydraulic driving power Ehyd from the regenerative power (hereinafter, written as "surplus regenerative power"). A case where the surplus regenerative power is equal to or smaller than the maximum exhaust brake power Emax_exh is a case where the surplus regenerative power is relatively small and hence, all the surplus regenerative power can be consumed by the exhaust brake just as in the case, for example, where the above-described single control is provided.

In a case of determining Etar_brk>Ehyd (S1: Yes) and (Etar_brk−Ehyd)≤Emax_exh (S3: No), the target brake power distribution calculation section 24 makes settings as the target generator power acting power Etar_MG=Etar_brk, the target exhaust brake power consumption Emax_exh=Etar_brk−Ehyd, and the target brake resistor power consumption Etar_br=0, and outputs control signals to the ECU 10*a*, the inverter 12, and the converter 15 (S4). That is, in a case where the regenerative power is larger than the target hydraulic driving power Ehyd and a difference between the regenerative power and the target hydraulic driving power Ehyd is equal to or smaller than the maximum exhaust brake power Emax_exh, the controller 20 supplies the regenerative power to the generator motor 11 operating as the motor and makes the exhaust brake consume a power equivalent to the difference between the regenerative power and the target hydraulic driving power Ehyd.

In Step S4, all the regenerative power generated by the electric motor 14 is supplied to the generator motor 11 so as to be converted to the drive power for the hydraulic pump 18. Meanwhile, the surplus regenerative power is consumed by the exhaust brake. In other words, the throttle device 10*b* is operated to increase the target exhaust brake power consumption Etar_exh of the engine 10 so that the regenerative power supplied to the generator motor 11 can be consumed by the engine 10 and the hydraulic pump 18.

On the other hand, a case where the surplus regenerative power is larger than the maximum exhaust brake power Emax_exh is a case where a large regenerative power is continuously generated so that all the surplus regenerative power cannot be consumed by the exhaust brake just as in the case of descending a long slope, for example.

In a case of determining Etar_brk>Ehyd (S1: Yes) and (Etar_brk−Ehyd)>Emax_exh (S3: Yes), the target brake power distribution calculation section 24 makes settings as the target generator power acting power Etar_MG=Emax_exh+Ehyd, the target exhaust brake power consumption Etar_exh=Emax_exh, and the target brake resistor power consumption Etar_br=Etar_brk−Etar_MG, and outputs control signals to the ECU 10*a*, the inverter 12 and the converter 15 (S5). Specifically, in a case where the difference between the regenerative power and the target hydraulic driving power Ehyd is larger than the maximum exhaust brake power Emax_exh, the controller 20 supplies the target generator power acting power Etar_MG equivalent to a sum of the maximum exhaust brake power Emax_exh and the target hydraulic driving power Ehyd to the generator motor 11 operating as the motor, and makes the exhaust brake consume the maximum exhaust brake power Emax_exh, further making the resistor 16 consume a power equivalent to a difference between the regenerative power and the target generator power acting power Etar_MG.

According to the above embodiment, all the regenerative power is converted to the drive power in Step S2, which is transmitted to the hydraulic pump 18. In this manner, some of the required drive power during the combined control is covered by the regenerative power so that the mileage performance of the engine 10 can be improved while efficiently using the regenerative power.

Further, according to the embodiment, all the regenerative power is converted to the drive power transmitted to the hydraulic pump 18 in Step S4 and a power equivalent to the surplus regenerative power is used for operating the throttle device 10b of the engine 10. In this manner, some of the drive power for the hydraulic pump 18 which is used to be covered by the engine 10 is substituted with the regenerative power, so that the mileage performance of the engine 10 can be improved while efficiently using the regenerative power.

Further, according to the embodiment, only the surplus regenerative power that is more than the exhaust brake can consume is converted to heat by the resistor 16 in Step S5. In this manner, the consumption (conversion to heat) of the regenerative power not contributing to the operation of the wheel loader 100 is minimized so that an environmentally friendly wheel loader 100 can be realized.

Further, according to the above embodiment, all the regenerative power generated by the electric motor 14 is used up. This obviates a problem that the electric storage device is fully charged, disabling the vehicle to acquire as much braking power as required. That is, it is ensured that the wheel loader 100 can reliably acquire as much braking power as required during travel.

It is noted that the correspondence relation between the above-escribed combined control and single control and the operations of steps S2, S4, S5 is to be taken as an example and not limited to this. Further, a specific example of the work vehicle is not limited to the wheel loader 100 and may include hydraulic shovels, dump trucks, motor graders and the like. Other device which can be added to the above-described embodiment as a device for positive adjustment of a torque rotating the output shaft of the engine 10 (hereinafter, written as "motoring torque of the engine 10") when the fuel is not injected includes exhaust brake, throttle valve, throttle of variable turbo and the like. Even if these devices are not attached, the engine motoring driving power can be calculated. In this case, the target driving power corresponding to the above-described motoring torque of the engine 10 always takes a constant value, namely agrees with the driving power corresponding to the maximum motoring torque of the engine 10.

It should be understood that the above embodiments are exemplary for illustrating the present invention and are not intended to limit the scope of the present invention. Those skilled in the art can carry out the present invention in a variety of modes without departing from the subject-matter of the present invention.

REFERENCE SIGNS LIST

10 . . . engine,
10a . . . ECU,
10b . . . throttle device
11 . . . generator motor,
12, 13 . . . inverter,
14 . . . electric motor,
15 . . . converter,
16 . . . resistor,
17 . . . hydraulic oil tank
18 . . . hydraulic pump
19 . . . directional control valve,
20 . . . controller,
21 . . . target electric-machine driving power calculation section,
22 . . . maximum exhaust brake power calculation section,
23 . . . target hydraulic driving power calculation section,
24 . . . target brake power distribution calculation section,
25 . . . target engine speed calculation section,
100 . . . wheel loader
101 . . . lift arms
102 . . . bucket
103 . . . front wheels
104 . . . front frame,
105 . . . cab
106 . . . rear wheels,
107 . . . rear frame,
108 . . . lift arm cylinders,
109 . . . bucket cylinder
110 . . . center pin
111L, 111R . . . steering cylinders

The invention claimed is:

1. A work vehicle comprising:
an engine;
a generator motor for generating electric power by operating on drive power of the engine;
an electric motor operating on electric power supplied from the generator motor;
drive wheels rotating with drive power of the electric motor transmitted thereto;
a hydraulic pump for force feeding hydraulic oil by operating on the drive power transmitted from the engine or the generator motor operating as a motor;
a hydraulic actuator operating on the hydraulic oil supplied from the hydraulic pump;
a throttle device for actuating an exhaust brake as disposed at a tube exhaust duct of the engine; a controller for controlling operations of the generator motor and the throttle device; and
a resistor for converting a regenerative power to heat,
wherein the controller
calculates the regenerative power outputted from the electric motor and a target hydraulic driving power for driving the hydraulic pump,
supplies the regenerative power to the generator motor operating as the motor and makes the generator motor consume the regenerative power in a case where the regenerative power is equal to or smaller than the target hydraulic driving power,
supplies the regenerative power to the generator motor operating as the motor and makes the exhaust brake consume a power equivalent to a difference between the regenerative power and the target hydraulic driving power in a case where the regenerative power is larger than the target hydraulic driving power,
calculates a maximum exhaust brake power consumed by the exhaust brake in a case where the throttle device is throttled to maximum,
supplies the regenerative power to the generator motor operating as the motor and makes the exhaust brake consume a power equivalent to a difference between the regenerative power and the target hydraulic driving power in a case where the regenerative power is larger than the target hydraulic driving power and the difference between the regenerative power and the target hydraulic driving power is equal to or smaller than the maximum exhaust brake power, and
supplies a target generator power acting power equivalent to a sum of the maximum exhaust brake power and the target hydraulic driving power to the generator motor operating as the motor, makes the exhaust brake consume the maximum exhaust brake power, and further makes the resistor consume a power equivalent a difference between the regenerative power and the target generator power acting power in a case where the difference between the regenerative power and the target hydraulic driving power is larger than the maximum exhaust brake power.

2. The work vehicle according to claim 1, wherein the controller calculates the regenerative power based on an actual travelling speed of the work vehicle, and a target travelling speed determined from an accelerator pedal stepping rate, a brake pedal stepping rate, and a travelling direction of the work vehicle.

3. The work vehicle according to claim 1, wherein the controller calculates the target hydraulic driving power based on a present discharge pressure and a present discharge flow rate of the hydraulic pump.

4. The work vehicle according to claim 1, wherein the controller calculates the maximum exhaust brake power based on a present rotational speed of the engine.

* * * * *